June 22, 1965   E. S. GWATHMEY   3,190,127
DAMPED ACCELEROMETER
Filed July 27, 1962

INVENTOR.
Edward S. Gwathmey

3,190,127
DAMPED ACCELEROMETER
Edward S. Gwathmey, Earlysville, Va., assignor to Specialties Incorporated, Syosset, N.Y.
Filed July 27, 1962, Ser. No. 212,824
9 Claims. (Cl. 73—515)

This invention relates to damping devices and systems and especially to a novel damping device in combination with other devices or instruments.

In using instruments, controls, and in many machines and electrical and mechanical devices generally, there is often a need to damp the movement of a member or component of a device or system. While various damping means have been used there have often been lacking desirable features which my improved damping system provides. One application of my damping system is in conjunction with an accelerometer.

An object is to provide a damping device or system in which a mass is relatively movable in virtually straight line motion with little friction.

Another object is to provide a damping device in combination with an automatically controlled throttle for aircraft, the combination being called "Auto-throttle" if desired.

A further object is to provide an effective damping system which can be applied to a variety of machines, devices, and instruments.

An additional object is the provision of a novel damping or smoothing system which operates a potentiometer or other electrical control means.

A further object is to provide an improved damping system for accelerometers for use in conjunction with aircraft or for use with other devices.

Other objects will be evident in the following description.

Figure 1:
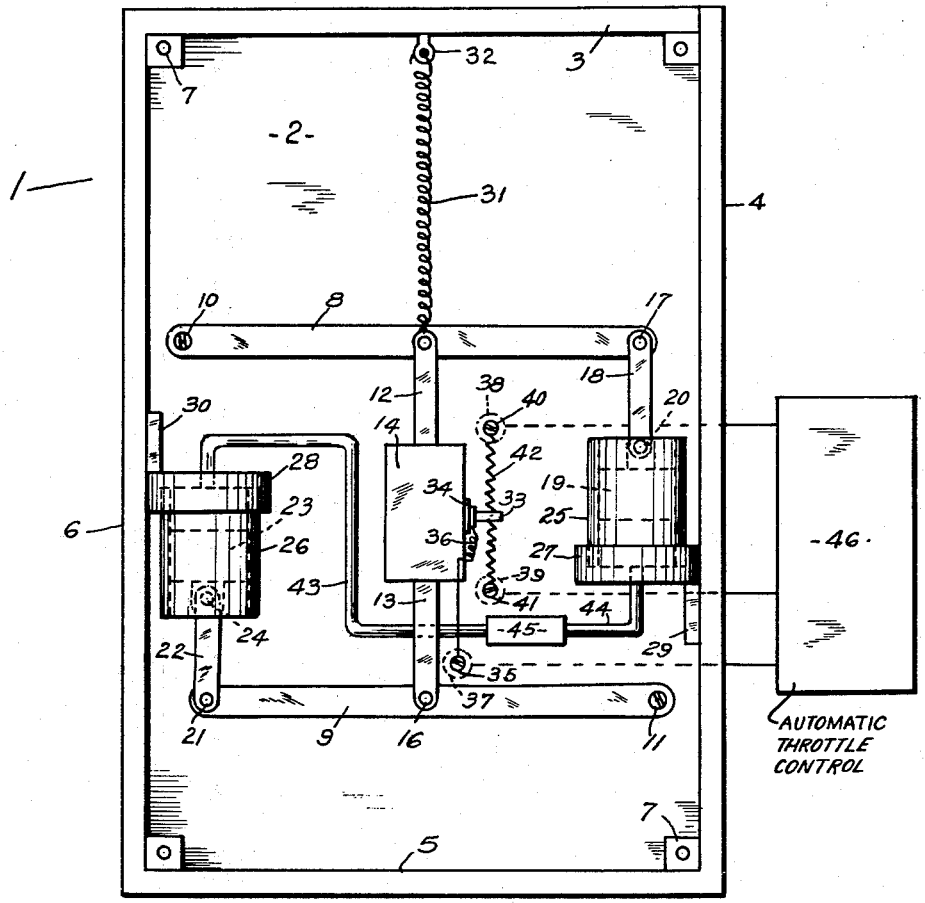
FIGURE 1 is an elevation of my improved accelerometer damping system use in conjunction with an automatic throttle control; a cover plate of the housing being removed.

In FIGURE 1, housing 1 has rear wall 2 and associated walls 3, 4, 5, and 6. The cover plate is not shown but may be fastened to the device by means of screws threaded into threaded holes in corner blocks 7.

Arms 8 and 9 are pivoted to wall 2 by respective pivot pins or screws 10 and 11 screwed into threaded holes in wall 2. These arms are substantially parallel and are joined by aligned bars or arms 12 and 13 extending from member 14 which serves as an inertia mass. Bar 12 is pivoted to arm 8 at 15 and bar 13 is pivoted to arm 9 at 16. Bar 8 is pivoted at 17 to link 18 which is attached to piston 19 preferably by means of pivot 20 although if the movement is small the latter connection could be a fixed attachment.

Bar 9 is pivoted at 21 to link 22 which may be pivoted to piston 23 at 24. The pivots 15 and 16 are substantially half way between respective pivots 10–17 and 11–21. The pistons 19 and 23 are preferably made of graphite and associated cylinders 25 and 26 are preferably made of glass or other equivalent material. These cylinders are held in respective cuplike base members 27 and 28 and may be fastened by means of cement, clamps, or the like. The members 27 and 28 have respective feet 29 and 30 which may be attached to the casing by welding or by screws. It will be observed that the open end of cylinder 25 is "up" whereas the open end of cylinder 26 is "down."

Tension spring 31, preferably relatively long, is attached to eye bolt 32 screwed into a hole in wall 3, and to arm 8 although this spring may be fastened to member 14. Conductive wiper 33 is supported on insulating block 34 fastened to member 14 and is electrically connected by flexible conductor 36 to binding post screw 35 which is insulated from the casing and which holds binding post 37 exteriorly on the casing. Binding posts 38 and 39 are similarly mounted and are supported by respective insulated screws 40 and 41 to which ends of preferably rigid resistor 42 are attached. Wiper 33 is arranged to rub resistor 42 lightly when member 14 moves vertically or otherwise relatively thereto, or to be more exact, when the resistor is moved relatively to the wiper.

Figure 2:
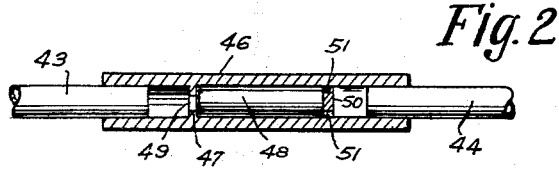
FIGURE 2 is a part sectional elevation of a temperature-compensated pneumatic resistance unit, for use with the damping device of FIGURE 1.

Tubes 43 and 44, preferably made of metal or other rigid material, are joined by pneumatic resistance element 45 which may be designed as illustrated in FIGURE 2. The binding posts are shown connected with device or system 46 indicated generally. This may be an "Autothrottle" as made by Specialties, Incorporated of Charlottesville, Virginia, or it may be any device or system in which an accelerometer is included as part of the system. While a potentiometer is shown as the take-off means for the accelerometer I also contemplate that photoelectric, capacitive, magnetic, or other means may be employed to sense changes in relative position of the inertial element 14. Some of these means would have the advantage that friction would be virtually negligible. Ends of tubes 43 and 44 are arranged to communicate with respective cylinders 26 and 25, being connected with ports in bases 28 and 27 in leak-proof manner.

In operation, the casing 1 is attached to an aircraft, for example, the members 12 and 13 being suitably aligned as are the axes of cylinders 25 and 26. The pivoted mechanism constitutes, in effect, a Watts linkage so that relative movement between member 14 and the casing is almost linear. Spring 31 normally supports the inertia member 14 and attached pistons and the spring may be sufficiently long that there is only a small different in the spring rate over displacements normally encountered.

As the flying aircraft suddenly drops in elevation the mass 14 will tend to remain in spatial position temporarily and piston 19 will be moved upward in cylinder 25 to increase the effective volume of the cylinder. Simultaneously the piston 23 will rise in cylinder 26 thereby decreasing the effective volume of cylinder 26. These piston movements cause piston 23 to force air, or other gas, out of cylinder 26 and through tube 43 and pneumatic resistance element 45 and thence through tube 44 and into cylinder 25 the effective volume of which is increasing. This exchange of air between the cylinders tends to nullify the "spring rate" for the air or other gas which may be used, since one volume of air is being compressed as an equivalent volume of air is being expanded. This feature aids the device in uniformity and sensitiveness of action and tends to make the response largely inertial, particularly if suspending spring 31 is relatively long.

Another desirable feature is that the damping effect, as influenced by the cylinders, takes place at longer distances from the supporting pivots of the arms than the inertial forces which are applied at shorter distances from the supporting pivots. The relative effectiveness of the damping and inertial effects will then vary as the square of the pivot distances.

The flow of air between the cylinders is partly controlled by resistance unit 45 which may be temperature compensating. As shown in FIGURE 2 this unit may have outer tube 46 and inner apertured wall 47 near which the end of rod 48 is placed to restrict flow of air or other gas through aperture 49. Rod 48 is fastened to cross wall 50 having apertures or ports 51. Tube 44 is placed in one end of tube 46 and soldered or otherwise sealed and tube 43 is similarly attached in the opposite end of tube 46.

Rod 48 is made of different metal from that of tube 46 so that temperature changes will cause the end of rod 48 to vary in distance from wall 47 in accordance with temperature variations. The rod is preferably slightly smaller in diameter than the adjacent inner diameter of tube 46 so that an elongated flow-restricting passage is provided between the rod and tube. As the temperature changes both the change in length and diameter of rod 48, will therefore add to change the net area of the surrounding or adjacent passage. This effect will result in a temperature-compensated pneumatic resistance unit when the materials and dimensions are suitably chosen. Of course, bimetal or other thermostatic elements can be used to control the effective orifice or port of the unit.

If the accelerometer is used without suitable damping means there will be practically constant changes of adjustment or setting of the potentiometer or other take-off means. These variations will be so frequent and often so pronounced that no intelligible or effective control will be possible. However, when my novel damping system is used the control or automatic adjustment is so smooth that the performance of the automatic throttle control or other associated system is remarkably improved in effectiveness. This provides the pilot with a very important aid to safety and ease of operation of the aircraft.

While I have mentioned the sudden descent of an aircraft carrying my device, there is equal effectiveness of damping if the aircraft suddenly rises. The pistons will then be displaced in the cylinders in opposite sense to that previously described. Furthermore, the accelerometer can be aligned with respect to the aircraft to damp movements of instrument or other members, due to accelerations or decelerations in horizontal or any other direction.

What I claim is:

1. In a damping system, a pair of cylinders, pistons movable in said cylinders, support means connecting said cylinders, an arm pivoted to said support means and attached to one said piston, another arm susbtantially parallel with the first named arm and pivoted to said support means and attached to the other said piston, an inertia means attached to said arms intermediate said pivots and said pistons, elongated resilient means attached to said support means and yieldingly supporting said inertia means and attached arms and pistons, the axis of said resilient means being substantially parallel with the axes of said cylinders, conduit means connecting the interiors of said cylinders, one said piston being effectively moved during acceleration or deceleration of said system in direction to force fluid out of the associated cylinder and into said conduit means while the other said piston is simultaneously effectively moved in direction to draw fluid from said conduit means into the other said cylinder, one said arm being pivoted adjacent one said cylinder and the oher said arm being pivoted adjacent the other said cylinder.

2. The system as described in claim 1, and including means damped by said system.

3. The system as described in claim 1, and including means restricting flow of fluid through said conduit means, and means damped by said system.

4. The system as described in claim 1, and including electrical means operatively connected with said damping system, and automatic throttle control means connected with said electrical means.

5. The system as described in claim 1, said arms being spaced apart and in substantially parallel alignment, and said inertia means being pivoted to said arms.

6. The system as described in claim 1, said arms being spaced apart and in substantially parallel alignment, and said inertia means being pivoted to said arms substantially halfway between the support pivots of said arms and the attachments of said pistons thereto.

7. In a damped accelerometer, a first cylinder having an open end facing in one direction, a second cylinder having an axis substantially parallel with the axis of said first cylinder and having an open end facing in a direction opposite to said one direction, a first piston movable in said first cylinder, a second piston movable in said second cylinder, support means connecting said cylinders, a first arm pivoted to said support means adjacent said second cylinder, a second arm substantially parallel with said first arm and pivoted to said support means adjacent said first cylinder, first connecting means pivoting said first arm to said first piston, second connecting means pivoting said second arm to said second piston, inertia means, pivot means connecting said inertia means to said first and second arms, conduit means connecting the interiors of said cylinders, resilient means yieldingly supporting said inertia means and said arms, and including means for sensing accelerations or decelerations of said accelerometer.

8. The system as described in claim 7, said inertia means being mounted to move in substantially relative vertical direction with respect to said support means.

9. The system as described in claim 7, the axes of said cylinders being substantially vertically aligned.

References Cited by the Examiner

UNITED STATES PATENTS

| 2,793,261 | 5/57 | Towle | 73—503 |
|---|---|---|---|
| 2,948,152 | 8/60 | Meyer | 73—514 |
| 2,960,871 | 11/60 | Ganther | 73—503 |
| 3,001,406 | 9/61 | Oyhus | 73—516 |
| 3,020,367 | 2/62 | Bariffi | 73—514 |

FOREIGN PATENTS

| 1,012,387 | 4/52 | France. |
| 159,078 | 6/57 | Sweden. |

RICHARD C. QUEISSER, *Primary Examiner.*

ROBERT L. EVANS, JAMES J. GILL, *Examiners.*